(No Model.)  5 Sheets—Sheet 1.

R. W. RENARD.
HAY TEDDER, RAKE, AND LOADER.

No. 440,504.  Patented Nov. 11, 1890.

Witnesses:
Arthur Ashley
D. H. Naylor

Inventor
Rudolph W. Renard
by Ross & Read
his Atty.

THE NORRIS PETERS CO., PHOTO-LITHO., WASHINGTON, D. C.

(No Model.)  
5 Sheets—Sheet 2.

R. W. RENARD.
HAY TEDDER, RAKE, AND LOADER.

No. 440,504. Patented Nov. 11, 1890.

Witnesses:  
Arthur Ashley  
D. H. Naylor

Inventor  
Rudolph W. Renard  
by Abbot Head  
his atty

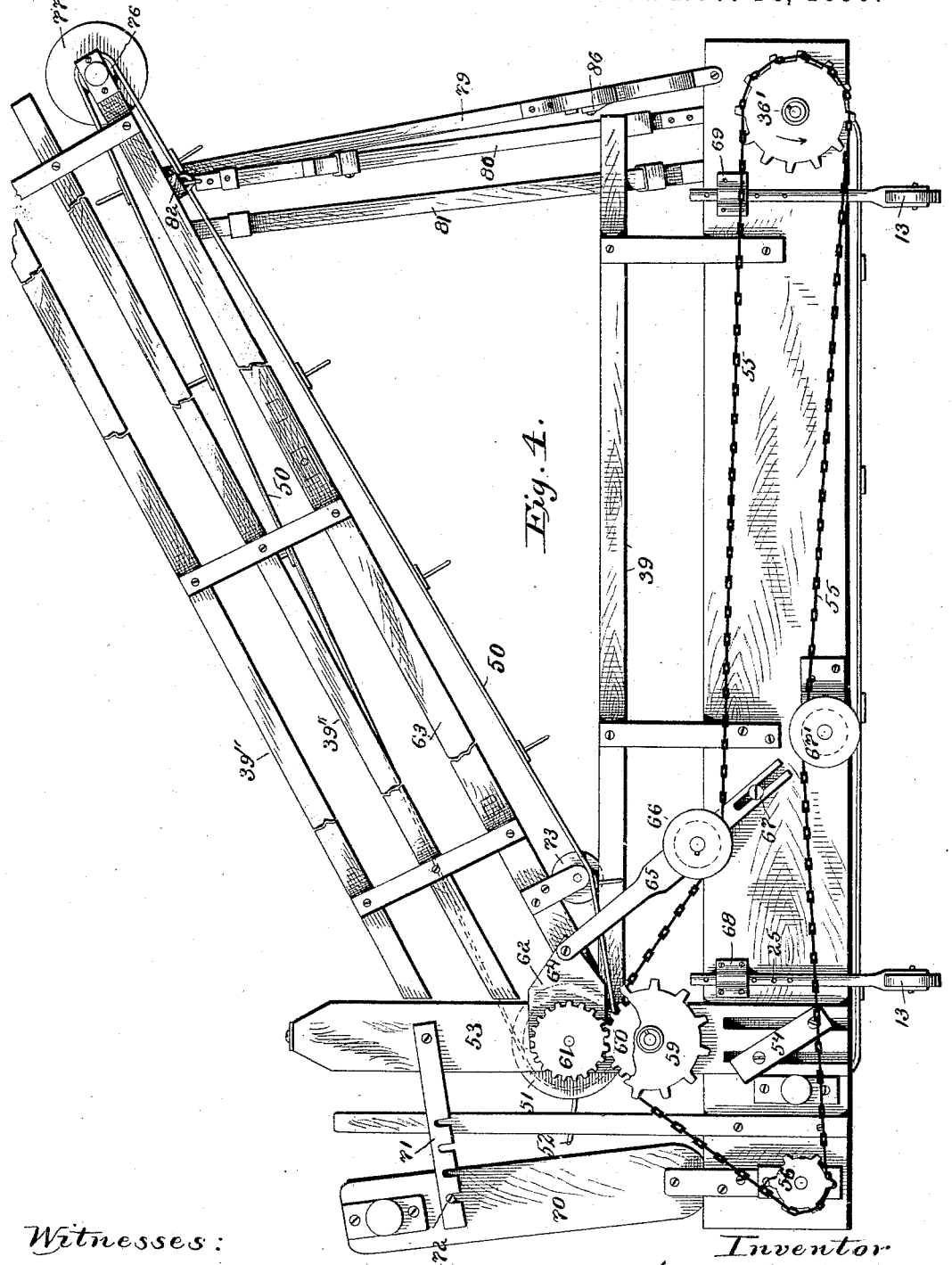

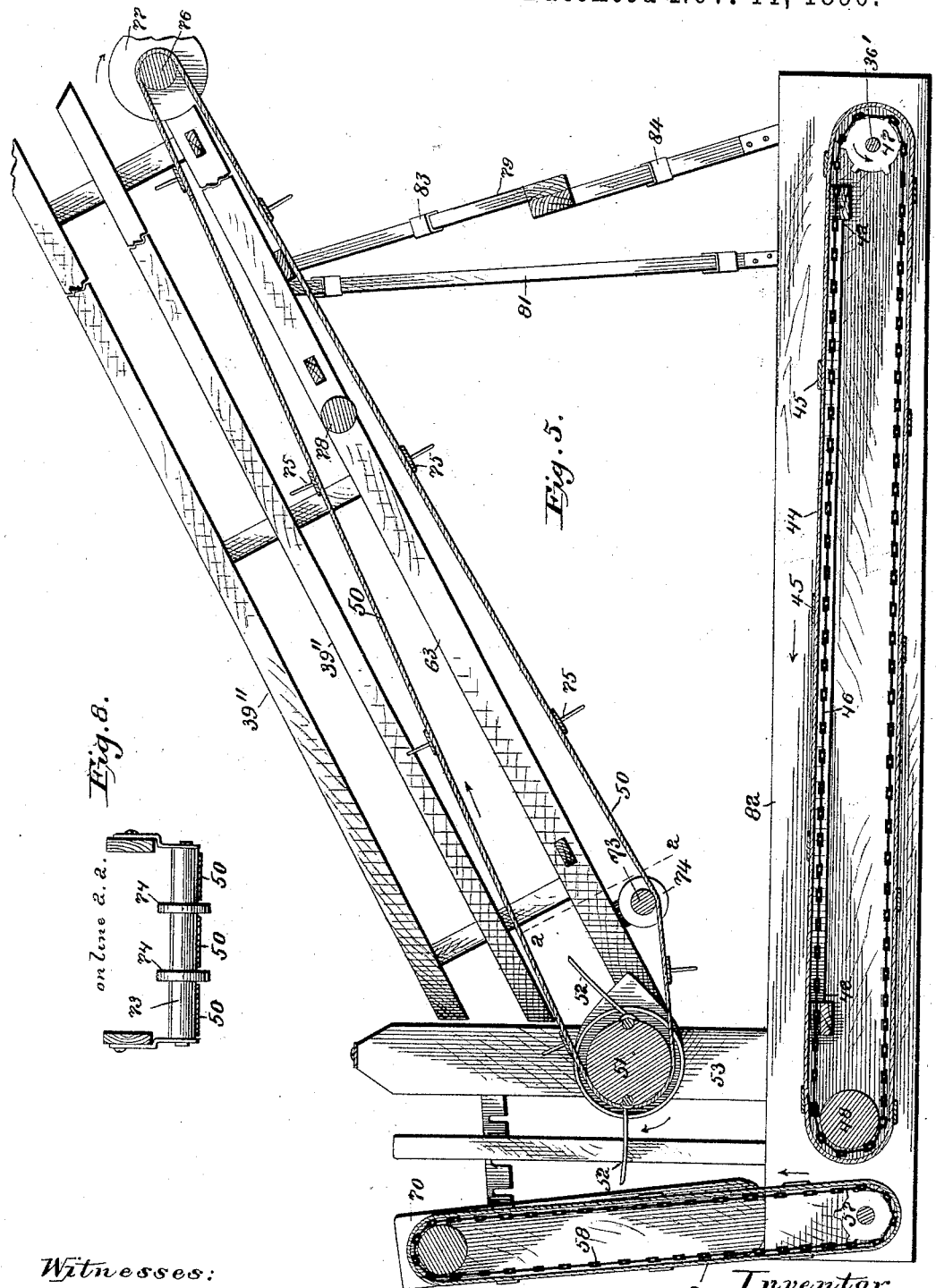

(No Model.)  
5 Sheets—Sheet 5.
R. W. RENARD.
HAY TEDDER, RAKE, AND LOADER.
No. 440,504.   Patented Nov. 11, 1890.
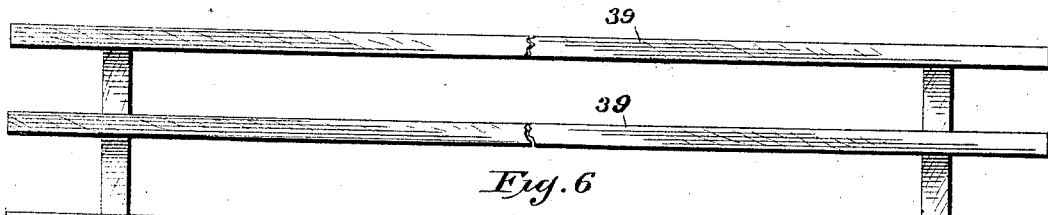
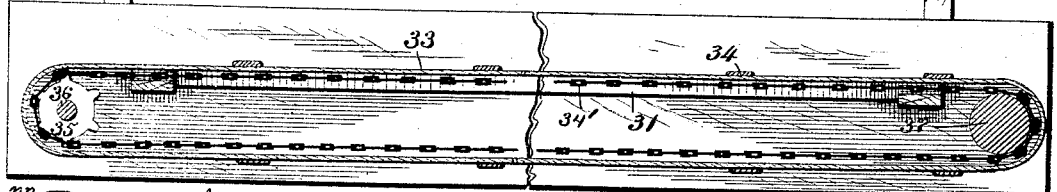
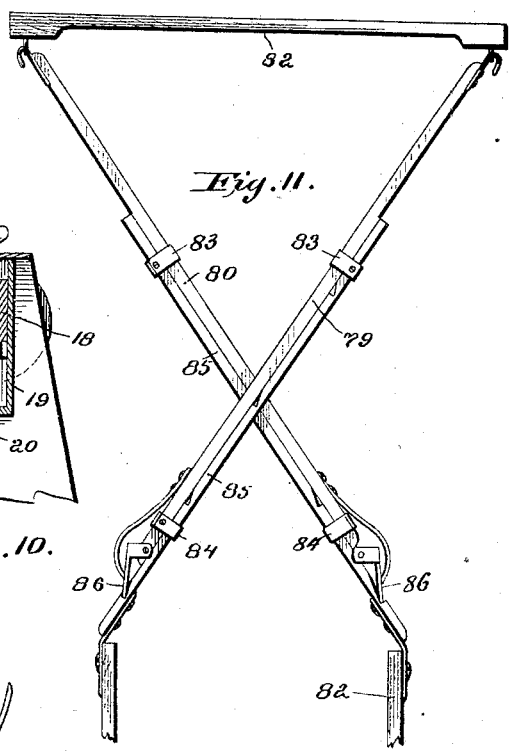
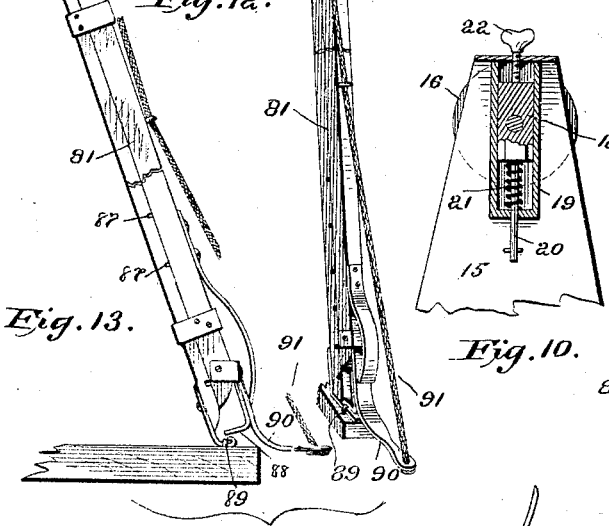
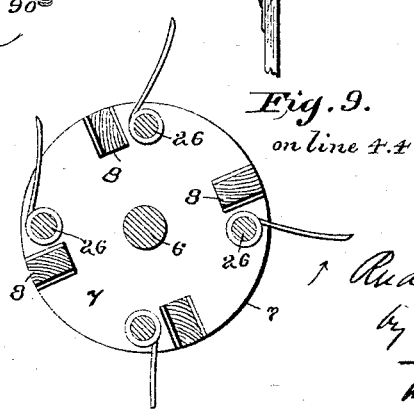

UNITED STATES PATENT OFFICE.

RUDOLPH W. RENARD, OF HOGESTOWN, PENNSYLVANIA.

HAY TEDDER, RAKE, AND LOADER.

SPECIFICATION forming part of Letters Patent No. 440,504, dated November 11, 1890.

Application filed May 27, 1890. Serial No. 353,304. (No model.)

*To all whom it may concern:*

Be it known that I, RUDOLPH W. RENARD, a citizen of the United States, residing at Hogestown, in the county of Cumberland and State of Pennsylvania, have invented certain new and useful Improvements in a Combined Hay Tedder, Rake, and Loader; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a combined hay tedder, rake, and loader, and has for its object the production of a machine which will be light of draft, separable in its parts, so that the bulky loading or loading and raking apparatus may be readily disconnected from the tedder for convenience of use.

The invention embodies various features of novelty, which will be particularly pointed out in the claims appended to this specification.

Figure 1:
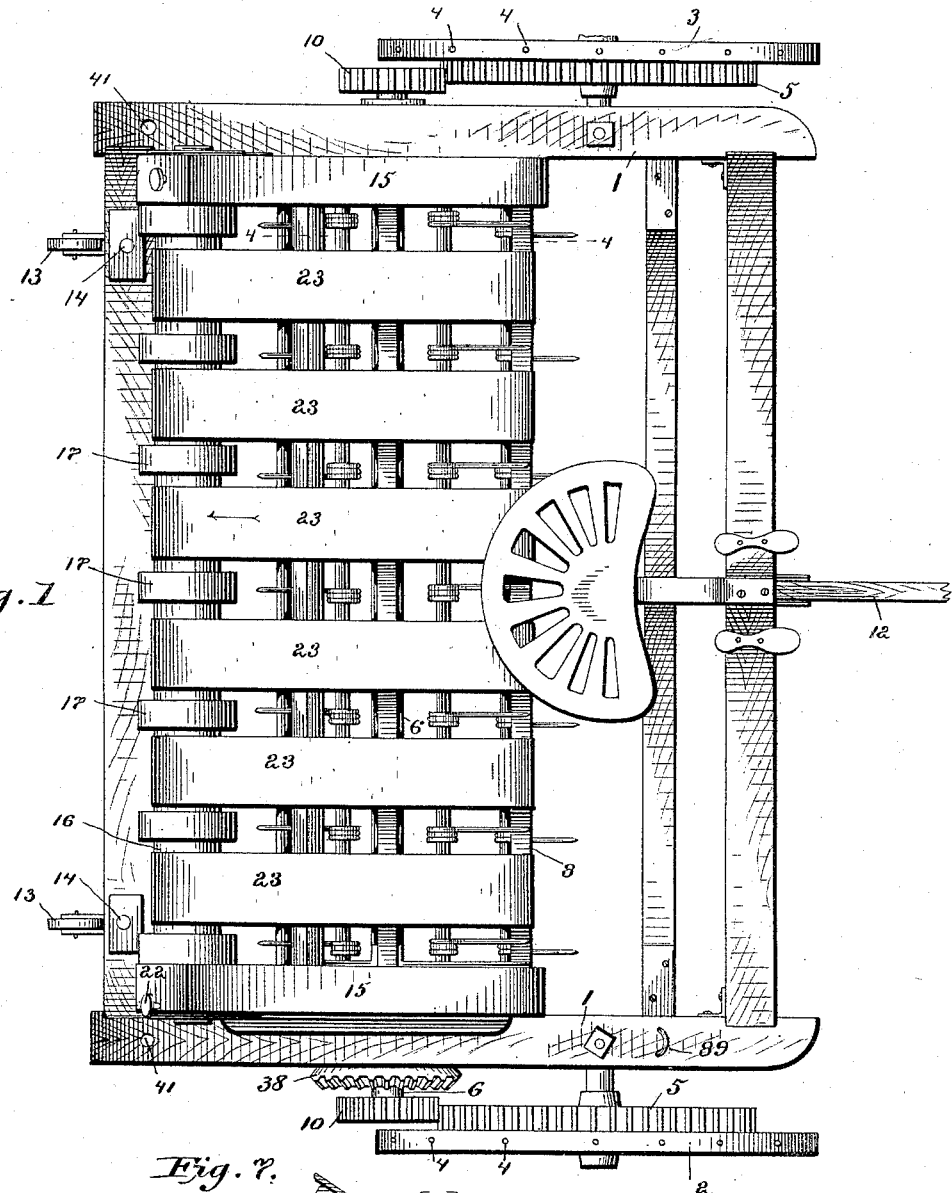
Figure 2:
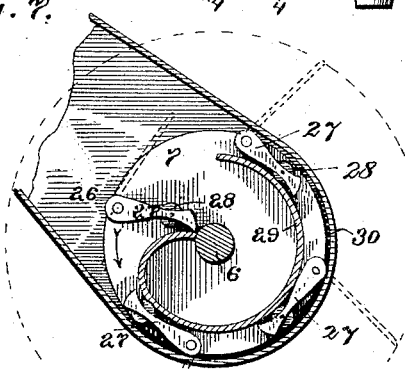
Figure 2:
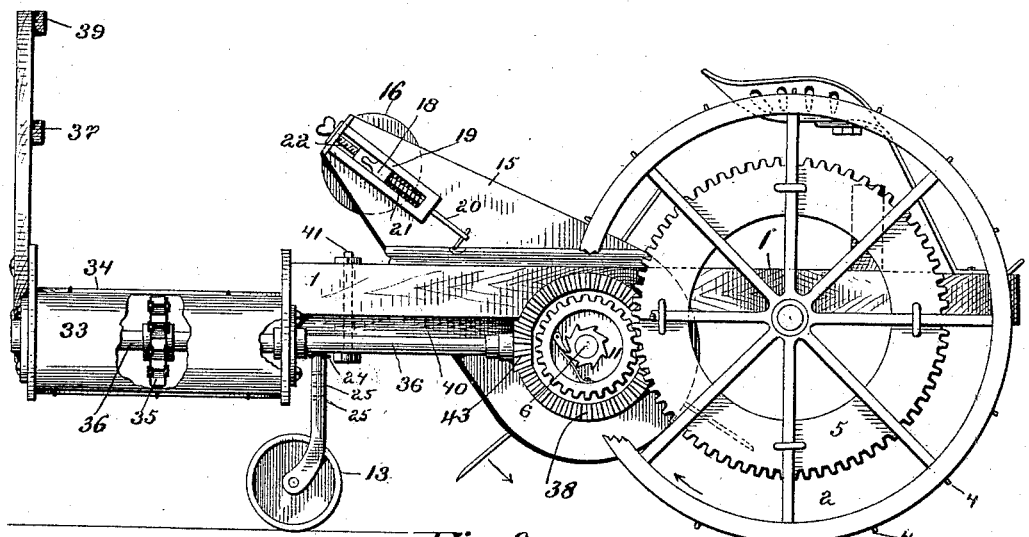
Figure 3:
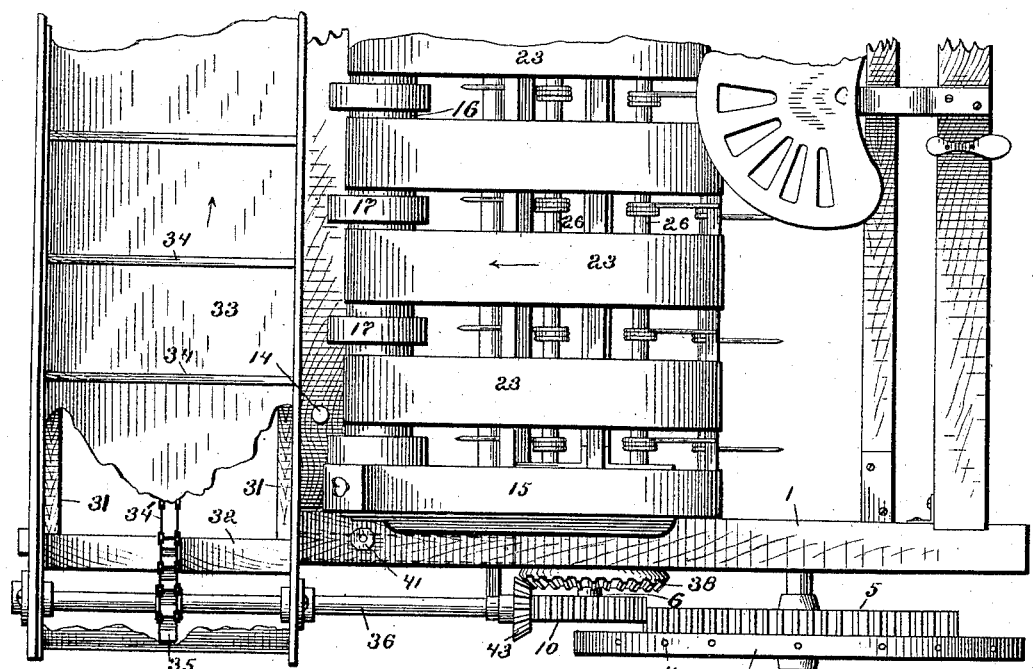

In the accompanying drawings, which illustrate the invention, Figure 1 is a plan view of the tedder. Fig. 2 is a side elevation of the tedder with the rake attached. Fig. 3 is a partial plan of Fig. 2. Fig. 4 is a side elevation of the loading mechanism detached from the tedder. Fig. 5 is a view of the loading mechanism, partly in section, to show the construction of the carriers. Fig. 6 is a sectional view of the side-delivery apparatus of the rake detached from the tedder. Fig. 7 is a sectional view of the rake-cylinder, showing the construction by which the rake-teeth are folded or opened. Fig. 8 is a cross-sectional view on line 2 2 of Fig. 5, showing the guide-roller for preventing lateral displacement of the elevator-aprons. Fig. 9 is a cross-sectional view of the rake-cylinder on line 4 4, Fig. 1. Fig. 10 is a view, partially sectional, showing the means for adjusting the tension of the tedder-aprons. Figs. 11, 12, and 13 are views of details showing the structure of the slip-stays by which the elevation of the point of discharge of the loader may be regulated.

The combined machine is made up of three separable parts, so that when it is desired to simply turn and scatter the hay for drying the tedder, as shown in Fig. 1, may be used alone, thus making the machine of much lighter draft than when the loading machinery is attached; or when it is desired to gather the hay into windrows the side-delivery apparatus belonging to the rake (see Fig. 6) may be readily bolted to the tedder-frame, thus producing the rake shown in Figs. 2 and 3; or when it is desired to load the hay upon a wagon the loading mechanism is attached by bolting to the tedder-frame, this loading mechanism being shown in Figs. 4 and 5.

First, with reference to the tedder, in the description of which attention is called to Figs. 1, 2, 3, and 7, on a truck or frame 1 are mounted the axles of the traction-wheels 2 3 of the machine, the tires of which wheels are studded with pins or lugs 4, which are forced into the ground by the weight of the machine and prevent dragging or sliding. Each of the traction-wheels is provided with a gear-wheel 5, rigidly secured to it upon its inner side. This wheel intermeshes with a gear-wheel mounted on the axis 6 of the rake-cylinder, which cylinder is a light strong frame-work comprising a head 7 at each end (see Fig. 9) and a series of longitudinal ribs 8, firmly fixed thereto. Spindles 26, on which the rake-teeth are secured, are pivotally supported in the cylinder-heads 8 and move in a rotary direction with the cylinder. The gear-wheel 10, which drives the rake-cylinder, moves freely in one direction when the machine backs, but carries the cylinder with it when the machine moves forward, which will be understood from an inspection of Fig. 2, through the instrumentality of a ratchet-wheel 11, firmly secured to the axis of the cylinder, and a co-operating pawl on gear-wheel 10, the gear-wheel 10 being loosely mounted on the axis. The machine is provided with a tongue 12 for the horses, a seat for the driver, as shown, and two casters 13, the vertical posts or stems of which enter holes 14 in the rear of the frame. The rake-cylinder is journaled in two metallic side plates 15, firmly secured to the frame 1, and in the upper ends of these plates are adjustable journal-bearings 18 for the roller 16, these bearings sliding in slots 19 in the plates, a pin 20 and a spring 21 permitting the roller to yield when under strain, and a set-screw 22 being provided to take up slack in the aprons 23 when necessary. This construction is shown in detail in Fig. 10, wherein a bearing-block 18 is fitted in a slot of the plate and has secured to it a guide-pin 20, projecting through a hole drilled in the flanged wall of the slot 19. A spring surrounding the pin tends to press the block upwardly and holds it elastically against the tip of a set-screw 22, which enters freely a hole tapped in the block, and is adjusted by means of a thread cut in a metallic cap over the end of the plate. I have shown five narrow aprons 23, and these are prevented from slipping laterally by ridges or flanges 17 on the roller 16. These aprons span the rake-cylinder and roller 16 and form a bed for the hay when it is raised by the rake-teeth, and by their movement in the direction of the arrow deposit the hay at the rear of the machine. The rake-teeth are of such a length that when the machine is in motion and they reach their lowest point of depression their tips are close to the ground; but they are adjustable to or from the ground by means of a pin 24, which may be inserted in any one of a series of holes 25 in the stem of the caster 13. As rotary movement is imparted to the rake-cylinder when the machine moves forward, the spindles of the rake-teeth are carried bodily around with said cylinder, but are caused to oscillate, so that after lifting the hay upon the aprons 23 they will fold toward the center of the cylinder, an incident which will prevent the hay being pulled through between adjacent aprons.

The mechanism by which the folding action is accomplished is illustrated in Fig. 7. The rake-teeth spindles 26, as hereinbefore stated, are journaled in the cylinder-heads 7, which latter turn with the cylinder-axis 6. On one end of each spindle 26 is fixed a crank or tumbler 27, near the end of which is journaled a roller 28, and this roller moves between two guides integral with the inside of the plate 15. These guides are indicated at 29 30. One is cam-shaped, as shown in Fig. 7. As the cylinder turns, the roller follows the guide 29 and the rake-teeth are caused to expand or open, always forming a bed for the hay until they deposit upon the aprons 23, when they fold toward the center by reason of the tumbler dropping from the end of the cam 29, as will be readily understood upon inspection of Fig. 7.

In case it is desired to rake the hay into windrows the side-delivery conveyer (shown in Figs. 2, 3, and 6) is connected to the tedder. This consists of a frame 31 32, in which an apron 33, provided with transverse laths 34, is supported. In the middle of the apron and attached thereto underneath is a sprocket-chain 34', which engages a sprocket-wheel 35, secured to a spindle 36, journaled in the side-delivery frame, and at the other end of the frame the apron travels over a roller 37. The apron and laths are of sufficient width to rest upon the side timbers 31 of the frame. I find that it is of great importance to use but one chain on each apron, inasmuch as it is very difficult to make two sprocket-chains so closely alike and homogeneous as to avoid a drag on one side and a gain on the other if more than one chain be used. The spindle 36 is provided with a bevel gear-wheel 43, which engages a bevel gear-wheel 38, fixed to the axis of the rake-cylinder, so that when the latter revolves the spindle 36 rotates and carries the apron in the direction of the arrow. Guard-rails 39 are secured to the rear of the side-delivery frame, which prevent the hay falling behind the machine. The side-delivery frame is connected to the tedder by bolts 41, passing through the side timbers of the tedder-frame 1, the bolts being tightened by nuts, as shown. To connect or disconnect the side-delivery frame from the tedder, and thereby convert the entire machine into a rake or tedder, respectively, it is only necessary to apply or take out the two bolts 41, one on each side. In the operation of the rake the hay is deposited by the aprons 23 upon the apron 33, and by the latter is dropped in windrows at the side of the machine as the latter moves forward.

The loading mechanism is illustrated in Figs. 4, 5, 8, 11, 12, and 13, Sheets 3, 4, and 5 of the drawings. The mechanism comprises a series of aprons by which the hay, after being delivered by the tedder-aprons, is carried laterally in one direction, and then carried upwardly and laterally in the opposite direction and deposited upon a wagon at the rear side of the machine. This apparatus is connected with and disconnected from the main frame 1 of the tedder in exactly the same manner as the rake-frame, which has already been fully described—that is to say, by means of the bolts 41, Fig. 3, passing through side timbers on the loading-frame corresponding in position to the side timbers 40 of the rake-frame. Spindle 36' (see Figs. 4 and 5) corresponds to spindle 36 of Fig. 3, and is provided with a bevel gear-wheel co-operating with 38 and corresponding to wheel 43 of Fig. 3. It will therefore be understood that spindle 36' revolves in the direction indicated by the arrow, Figs. 4 and 5, when the loading mechanism is attached and the machine moves forward through the field. An apron 44, provided with transverse laths 45, is moved in the direction of the arrow by a sprocket-chain 46, co-operating with a wheel 47, a suitable roller 48 being journaled in the other end of the apron-frame. A lifting-apron 49 raises the hay delivered to it by apron 44 upon the elevator-apron 50. The lower end of the elevator may or may not be provided with teeth 52 to co-operate with the apron 49 in lifting the hay. In the drawings I have shown it so provided. The teeth are caused to fold and open in a manner identical with the teeth of the main rake-cylinder, and need not, therefore, be further described.

The posts 53, in which the cylinder 51 is mounted, are vertically adjustable, so as to adjust the elevator-apron with reference to apron 44 to accommodate different sizes of bundles of hay. This adjustment is provided for by slotting the posts, as shown in Fig. 4, and fixing them in the desired position of vertical adjustment by means of a cleat 54, and screws passing through the slot and securing the cleat to the frame. A drive-chain 55 communicates motion to wheel 56, which operates the lifting-apron 49 through the instrumentality of a central wheel and chain 57 58. The drive-chain 55 also operates sprocket-wheel 59, which is secured on the same spindle as gear-wheel 60, co-operating with gear-wheel 61, secured to the axis of the elevator-cylinder 51. Side arms 62 are attached to the post 53 on each side of the machine, in which the elevator-frame is journaled at a point 64, so that the top of the elevator may be raised and lowered to accommodate the point of discharge of the hay to the varying heights of the load upon the wagon, the mode of adjustment of which will be presently described. Pivoted to the arm 62 is a support 65, carrying a guide-roller 66, the low end of support 65 being slotted, and a guide-screw 67 is secured to the loader-frame and projects through the slot. When the post 53 is adjusted vertically, the roller 66 rises with it and permits sufficient slack in the sprocket-chain 55 to allow the post to be raised. A guide-roller 67' supports the lower side of chain 55.

On the rear of the loading apparatus are secured two sockets 68 69, into which may be inserted the stems of the casters, the holes in the stem permitting the rear end of the machine to be lowered or raised to adjust the rake-teeth the proper distance from the ground. These sockets are located on the rear side of the frame to reduce the strain when the machine is in operation on the connecting-timbers 40, Fig. 2. The supporting-frame 70 of the lifting-apron 49 is pivoted at its lower end, as shown in Fig. 4, and its upper end may be adjusted by means of the notched latch 71 and pin 72 to accommodate different quantities of hay, as in a field where the yield may be unusually heavy or where the windrows are exceptional in size.

To prevent the elevator-aprons 50, of which there are three, (see Fig. 8,) shifting laterally and being injured by the teeth 52, a guide-roller 73, provided with flanges 74, is mounted in bearings on the under side of the elevator-frame, and the aprons pass between the flanges. Suitable spikes are fastened to the elevator-aprons to prevent the hay from sliding. An end roller 76 for the aprons is provided at the discharge end of the elevator, and this roller is provided with one or more flanges or disk-shaped enlargements 77, which lift the hay clear of the aprons when it reaches the top of the elevator and prevent the aprons dragging the hay off the wagon to the ground. Side guard-rails 39'' are provided on the elevator to keep the hay on the aprons, and one or more auxiliary guide-rollers 78 for the apron may be provided.

In order to permit vertical adjustment of the discharge end of the elevator to suit the varying height of the the load of hay being deposited upon the wagon, slip-stays 79 80 81 are provided. The stays 79 80 are hooked at their upper ends to the the sides of a beam 82, secured to the top part of the elevator, and are secured below to the sides of the side-delivery frame. These stays consist, as shown, of two bars of wood jointed by means of collars 83 84, secured, respectively, to the two bars, so that they can be extended or pushed together. In one of the bars 85 of each stay are cut a series of notches, in which a spring-actuated pawl 86 may rest. It will be understood from this that when the rear end of the elevator is raised the stays 79 80 are expanded and the pawls or dogs fall into some one of the notches and lock the elevator in its position of adjustment. A supplemental slip-stay 81 is provided to prevent the top of the elevator from side sway or strain. This is similar in general construction to the supporting-stays 79 80, but its notches 87 are square, and the dog 88 when it falls into one of them locks the stay against slipping in either direction, as will be clearly understood upon inspection of Figs. 12 and 13. One end of this supplemental stay is hooked to the side of the upper end of the elevator, as shown best in Fig. 12, and the other end is secured to the front part of the machine at a point 89 (see Figs. 1 and 13) by means of a hook and staple. The dog 88 has an arm 90, in an eye of which a cord 91 is fastened, this cord passing through suitable guides to the rear of the elevator, where it is provided with a handle 92, within easy reach of an operator standing on the wagon. It will thus be evident that as the load of hay increases in height the operator, by pulling the cord 91 and lifting the end of the elevator, can adjust the point of discharge at will, the stays preventing the elevator from slipping back.

Several important incidents of my machine may be noted. One of these is that the rake-teeth pick up the hay with a forward sweep, (see Fig. 2,) so that, inasmuch as there is a series of gangs of teeth on the rake-cylinder, any hay which is dropped or not picked up by the first gang of teeth will be picked up by the following gang, thus enabling the machine to do clean work with a single transit over a field.

The convenient separability of the parts of the machine, so as to render its conversion into a tedder, rake, or loader a very simple act, is another important practical result.

The ready adjustability of all of the parts of the loading mechanism to adapt the machine quickly to all sorts of work, the double driving-gear on the tedder, a drive-wheel being placed on each side, (see Fig. 1,) giving the apparatus a smooth and easy motion, and the use of a single drive-chain in the middle of the aprons, insuring steady action and preventing unnecessary stoppages of the machine, are all important results contributing to an efficient operation of the machine.

Having thus described my invention, what I claim as new, and desire to secure by Letters Patent, is—

1. A combined hay tedder and rake provided with a side-delivery conveyer to deposit the hay in windrows, said conveyer being connected with the tedder by a separable joint.

2. The combination of the drive-wheels, a rake-cylinder having both ends of its axis geared to said drive-wheels to the rear of the wheel-axle, so as to rotate the cylinder in an opposite direction to the drive-wheels, a series of gangs of rake-teeth operated with a forward sweep, aprons between the teeth spanning the cylinder, and a roller to the rear, and connections whereby a conveyer for raking or loading the hay may be detachably secured to the tedder-frame.

3. A hay-rake comprising a rake-cylinder to pick up the hay, said cylinder being driven by the traction-wheels, a side-delivery conveyer, spindle 36, sprocket-wheel 35, co-operating-chain 34', and apron 33, to which the sprocket-chain is secured at a central line.

4. The combination of the main frame, traction-wheels, rotary rake-cylinder provided with gangs of teeth, aprons for carrying the hay from the teeth to the rear, and a side-delivery conveyer provided with arms 40 and separably connected by means of said arms to the main frame, whereby the tedder may be converted into a side rake.

5. A hay-loader comprising a series of rake-teeth for raising the hay from the ground, a side-delivery conveyer, an elevator having its receiving end adjacent to the discharge end of the conveyer and feeding to the opposite side of the machine, and an upright tail-piece co-operating with the adjacent ends of the conveyer and elevator to lift the hay upon the upper side of the latter.

6. In a hay-loader, the combination, with rake-teeth for lifting the hay from the ground, of a horizontal side-delivery conveyer and an elevator having its receiving end vertically adjustable with reference to the horizontal conveyer to adapt the apparatus to different quantities of hay, said elevator discharging the hay on the opposite side of the machine from that to which it is fed by the side delivery-conveyer.

7. The loading mechanism comprising a rake for raising the hay from the ground, a horizontal conveyer, an elevating-conveyer feeding in an opposite direction, and a cylinder co-operating with a tail-piece at the adjacent ends of the two conveyers to lift the hay from the horizontal to the elevating apron.

8. The combination, with a rake for raising the hay from the ground, of the horizontal side-delivery conveyer, an elevating-conveyer overhanging the same and vertically adjustable relatively thereto, and the end lifting-conveyer adjustable relatively to the elevating-conveyer.

9. The combination, with a rake for raising the hay from the ground, of the horizontal side-delivery conveyer, the lifting-conveyer at the discharge end of the same, a revolving cylinder provided with gangs of folding teeth co-operating with the two conveyers to lift the hay, and an elevating-conveyer co-operating with the folding teeth to receive the hay and deposit it upon a wagon.

10. The combination, with raking apparatus, of a side-delivery conveyer and an elevating-conveyer for a hay-loader provided with a lifting-cylinder having gangs of teeth to deposit the hay upon the elevator-aprons, two or more aprons, and a guard-roller 73, located near the lifting-cylinder, provided with wings or flanges to prevent damage to the aprons by the cylinder-teeth.

11. In a hay-loader, the combination, with an elevator having its discharge end vertically adjustable, of a slip-stay, a latch to lock the stay in different positions of adjustment against vertical displacement up or down, and a cord accessible to the operator at the top of the elevator to open the latch when adjustment is desired.

12. The combination of the side-delivery conveyer, an elevating-conveyer having its receiving end vertically adjustable with reference thereto, a drive chain or belt 55, and a pulley 66, connected with the elevator-frame and adapted to rise therewith when the elevator is adjusted, whereby the chain is kept in a proper condition of tension.

13. In a hay-loader, the combination of the elevator pivoted at its receiving end, slip-stays 79 80 at its discharge end to support it, and a supplemental slip-stay 81 to prevent side sway.

In testimony whereof I affix my signature in presence of two witnesses.

RUDOLPH W. RENARD.

Witnesses:
E. W. RUPP,
M. G. RUPP.